United States Patent
Keller et al.

(10) Patent No.: US 7,054,350 B2
(45) Date of Patent: May 30, 2006

(54) METHOD AND SYSTEM FOR ACQUIRING PSEUDO-NOISE (PN) DECADE-CODE PHASE

(75) Inventors: Merle L. Keller, Salt Lake City, UT (US); Vaughn L. Mower, Bountiful, UT (US); Steve J. McEntire, Salt Lake City, UT (US)

(73) Assignee: L3 Communications Corporation, New York, NY (US)

( * ) Notice: Subject to any disclaimer, the term of this patent is extended or adjusted under 35 U.S.C. 154(b) by 767 days.

(21) Appl. No.: 10/014,058

(22) Filed: Dec. 6, 2001

(65) Prior Publication Data

US 2003/0108085 A1    Jun. 12, 2003

(51) Int. Cl.
*H04L 27/30*    (2006.01)

(52) U.S. Cl. .............. 375/137; 375/145; 375/149; 375/367; 370/515; 342/357

(58) Field of Classification Search ............ 375/130, 375/133, 137, 145, 149, 150, 367; 370/514, 370/515, 516, 518; 342/352, 357, 418, 465
See application file for complete search history.

(56) References Cited

U.S. PATENT DOCUMENTS

| | | | | |
|---|---|---|---|---|
| 5,598,154 A | | 1/1997 | Wilson et al. | 341/50 |
| 5,666,122 A | * | 9/1997 | Carter | 342/357.15 |
| 5,917,444 A | * | 6/1999 | Loomis et al. | 342/357.12 |
| 6,433,734 B1 | * | 8/2002 | Krasner | 342/357.09 |

* cited by examiner

*Primary Examiner*—Dac V. Ha
(74) *Attorney, Agent, or Firm*—Harrington & Smith, LLP

(57) ABSTRACT

A method and system for synchronizing the PN phase of a pseudo-noise (PN) coded signal with a phase of a master PN decade-code is provided. The method includes the steps of associating the master PN decade-code initialization $t_0$ with a first time zone reference date and time and determining an elapsed time $t_1$. The next steps equate the elapsed time $t_1$ to a corresponding phase of the master PN code and synchronize the phase of the PN coded signal with the corresponding phase of the master PN decade-code.

20 Claims, 3 Drawing Sheets

METHOD AND SYSTEM FOR ACQUIRING PSEUDO-NOISE (PN) DECADE-CODE PHASE

BACKGROUND OF THE INVENTION

1. Field of the Invention

The present invention relates to spread spectrum communication systems using PN coding techniques and, more particularly, to acquiring PN code phase.

2. Prior Art

Spread spectrum (SS) systems, which may be CDMA systems, are well known in the art. SS systems can employ a transmission technique in which a pseudo-noise (PN) PN-code is used as a modulating waveform to spread the signal energy over a bandwidth much greater than the signal information bandwidth. At the receiver, the signal is de-spread using a synchronized replica of the PN-code.

In general, there are two basic types of SS systems: direct sequence spread spectrum systems (DSSS) and frequency hop spread spectrum systems (FHSS).

The DSSS systems spread the signal over a bandwidth $f_{RF} \pm R_c$, where $f_{RF}$ represents the carrier frequency and $R_c$ represents the PN-code maximum chip rate, which in turn may be an integer multiple of the symbol rate $R_s$. Multiple access systems employ DSSS techniques when transmitting multiple channels over the same frequency bandwidth to multiple receivers, each receiver sharing a common PN code or having its own designated PN-code. Although each receiver receives the entire frequency bandwidth, only the signal with the receiver's matching PN-code will appear intelligible; the rest appears as noise that is easily filtered. These systems are well known in the art and will not be discussed further.

FHSS systems employ a PN-code sequence generated at the modulator that is used in conjunction with an m-ary frequency shift keying (FSK) modulation to shift the carrier frequency $f_{RF}$ at a hopping rate $R_h$. A FHSS system divides the available bandwidth into N channels and hops between these channels according to the PN-code sequence. At each frequency hop time, a PN generator feeds a frequency synthesizer a sequence of n chips that dictates one of 2n frequency positions. The receiver follows the same frequency hop pattern. FHSS systems are also well known in the art and need not be discussed further.

As noted, the DSSS system PN-code sequence spreads the data signal over the available bandwidth such that the signal appears to be noise-like and random; but the signal is deterministic to a receiver applying the same PN-code to de-spread the signal. However, the receiver must also apply the same PN-code at the appropriate phase in order to de-spread the incoming signal, which explicitly implies synchronization between the receiver and transmitter. However, in group communication environments, such as a fleet battle-group where the battle-group composition changes regularly (daily or even hourly); or where the participants are engaged in a common training exercise, but geographically dispersed around the globe, typical synchronization techniques, such as resetting the start of the PN code for all the participants, is not practical. Moreover, communication interruptions due to resetting PN codes at an arbitrary time seam, such as days, weeks, months, and years, in a battle-group environment could have undesirable consequences. As used herein, a time seam occurs when a fleet of platforms begins its PN code from the beginning of a time event, such as the GPS day in which the fleet assembles. The convention used by the fleet is to ignore subsequent GPS day boundaries once communication among the fleet has begun, meaning that the PN code shared among the fleet is not reset at subsequent GPS day boundaries.

In this manner, fleet communications can persist for two or three days. However, a platform that attempts to join the fleet and participate in fleet communications, subsequent to the beginning of the time event is confronted with a time and PN code phase ambiguity and will be unable to join fleet communications. It is therefore desirable to provide a method and system whereby platforms (communication systems) may join fleet communications at any time with unambiguous time and PN code phase alignment.

SUMMARY OF THE INVENTION

The foregoing and other problems are overcome, and other advantages are realized, in accordance with the presently preferred embodiments of these teachings.

In accordance with one embodiment of the present invention, a method and system for synchronizing the PN phase of a pseudo-noise (PN) coded signal with a phase of a master PN code is provided. The method includes the steps of associating the master PN code initialization $t_0$ with a first time zone reference date and time and determining an elapsed time $t_1$. The next steps equate the elapsed time $t_1$ to a corresponding phase of the master PN code and synchronize the phase of the PN coded signal with the corresponding phase of the master PN code.

In accordance with another embodiment of the present invention, a system for acquiring a pseudo-noise (PN) coded signal is provided. The system includes a link control processor for capturing GPS time and converting the captured GPS time to elapsed PN code chips since time $t_0$ and a correlator for aligning the PN code phase in accordance with the elapsed PN code chips.

The invention is also directed towards a method for GPS-aided, seamless acquisition of a pseudo noise (PN) coded signal. The PN coded signal is modulated by a PN master code starting at a time $t_0$ in zone $z_0$, and the method includes the steps of determining a GPS time; converting the GPS time to a first estimate of elapsed number of chips associated with the PN master code; and adjusting the first estimate of the elapsed number of chips associated with the PN master code to correlate with the PN coded signal.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1A:
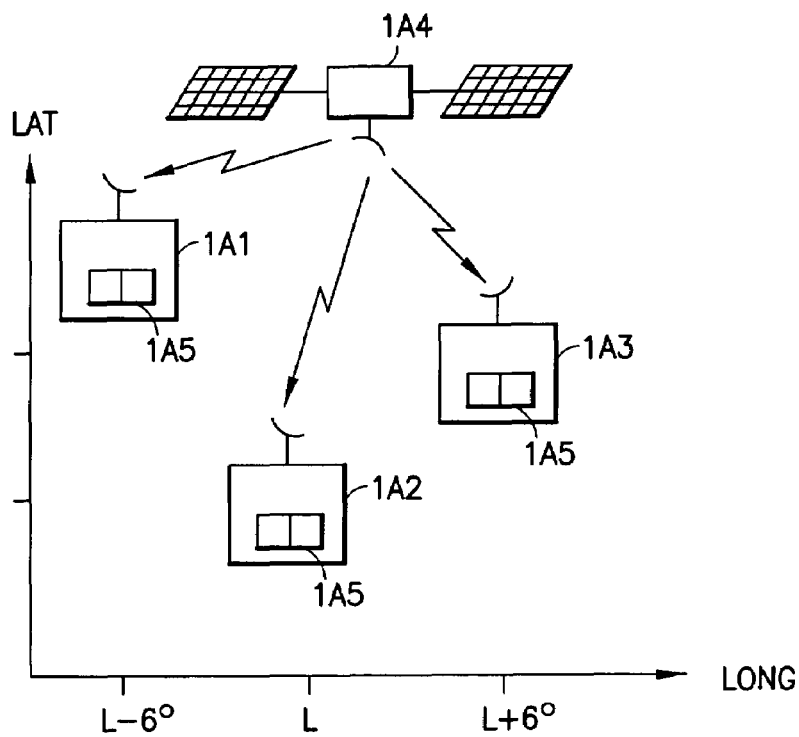
FIGS. 1A and 1B are pictorial diagrams of a co-located battle group (1A1, 1A2, 1A3) and a globally separated group (1B1, 1B2, 1B3), respectively, incorporating features of the present invention.
Figure 1C:
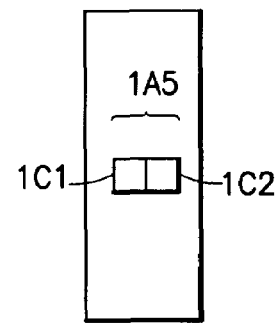
FIG. 1C is a diagram of a mobile platform from FIG. 1A or 1B.
Figure 1B:
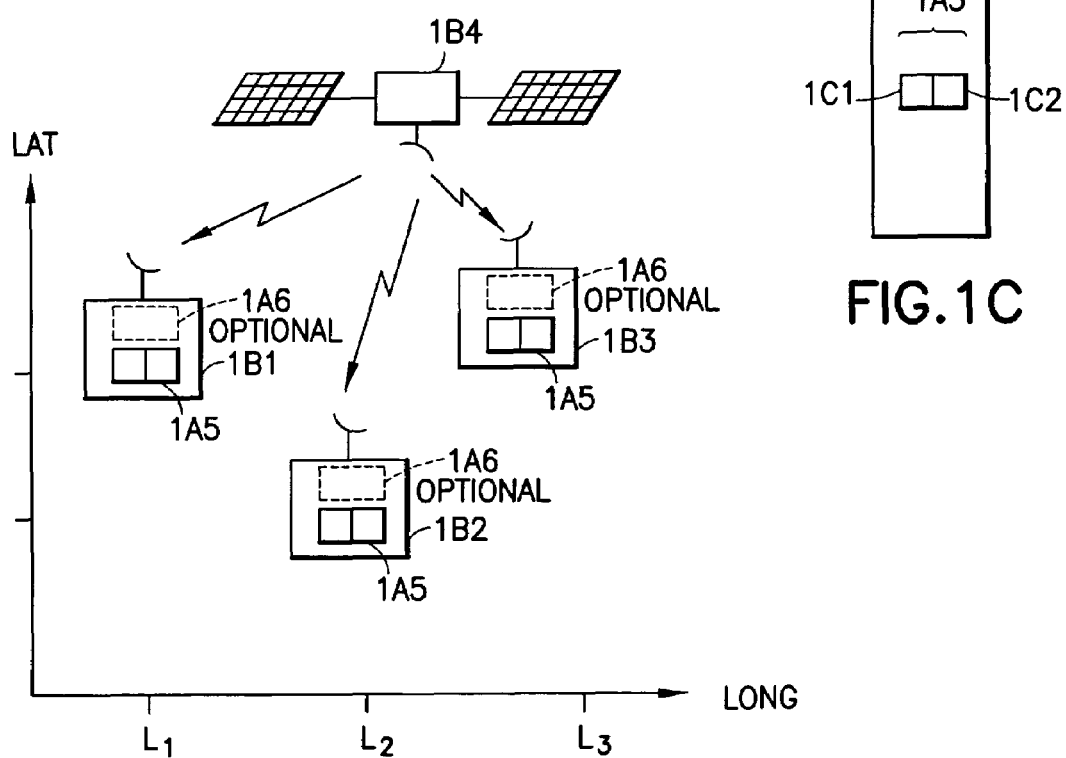

Referring to FIGS. 1A and 1B, there are shown pictorial diagrams of a co-located group (1A1, 1A2, 1A3) and a globally separated group (1B1, 1B2, 1B3) respectively, incorporating features of the present invention. It will be appreciated that the 12 degrees longitude between group-members 1A1 and 1A3 is representative of the longitudes of members in a group and not limiting. It will be further appreciated with respect to FIG. 1B that the group members may be at any suitable longitude in accordance with the teachings of the present invention. Although the present invention will be described with reference to the embodiments shown in the drawings, it should be understood that the present invention could be embodied in many alternate forms of embodiments. For example, it should be appreciated that the teachings herein may be applied to any group or assembly of PN-code-coordinated receivers, including those that are fixed in place; vehicle mounted; and/or hand carried.

In the preferred embodiment, shared or universal time is determined from a Global Positioning System (GPS) satellite (1A4, 1B4); however, any suitable method for establishing shared time may be used; such as for example, master/slave clocks (FIG. 1B, item 1A6) having atomic clock precision, e.g. cesium or rubidium atomic clocks. As shown in FIGS. 1A and 1B, each mobile platform contains a correlator 1A5. Correlator 1A5 includes, as shown in FIG. 1C, a link control processor 1C1 and a local correlator 1C2.

As disclosed herein, the present invention describes a novel method and system for PN code phase coordination and alignment of direct sequence spread spectrum signals. In the preferred embodiment, the PN code is a PN decade-code and is constructed with at least four subcomponent PN codes. However, in alternate embodiments any suitable number of subcomponent PN codes may be used. The PN decade-code, once started, spans a predetermined time span before repeating. In a preferred, but not limiting, embodiment, the time span is on the order of ten years. In general, the predetermined number of years is measured in decades.

Figure 2A:
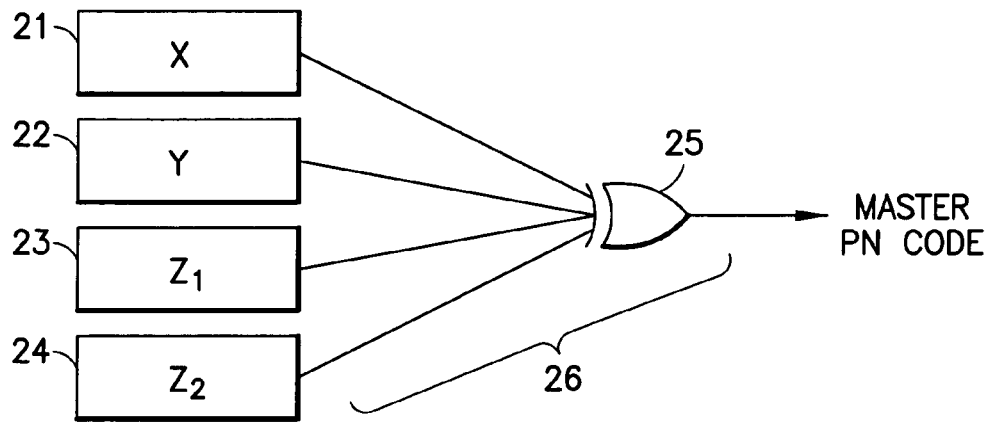
FIG. 2A is a block diagram of a master PN code generator incorporating features of the present invention.
Figure 2B:
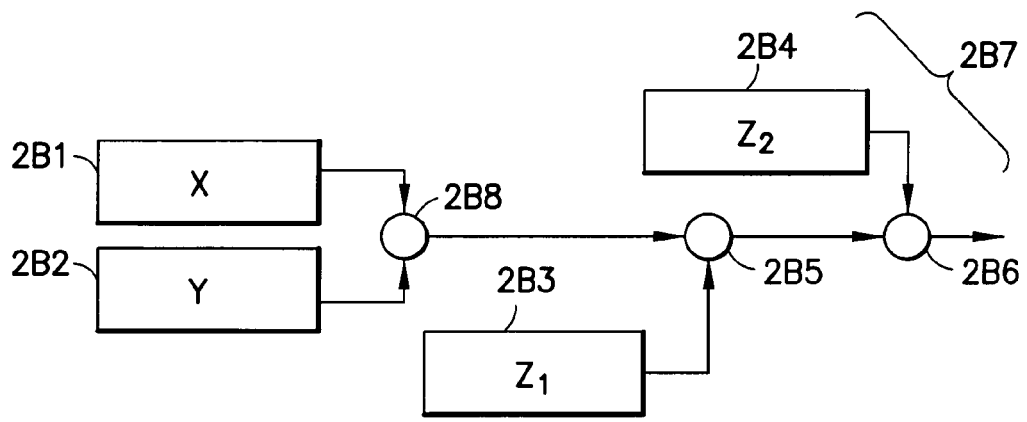
FIG. 2B is a block diagram of an alternate embodiment of a master PN code generator incorporating features of the present invention.
Figure 3A:
FIG. 3A is a pictorial representation showing one relationship between elapsed time and elapsed PN code chips.

Referring also to FIGS. 2A and 2B there are shown alternate block diagrams of a master PN code generator implementing features of the present invention. As shown, the combination of four subcomponent PN codes (21–24, or 2B1–2B4) via exclusive-or 25 in FIG. 2A or logic combiners 2B5–2B6, and 2B8 in FIG. 2B, allows for high chipping rates and pseudo-noise (PN) code lengths that repeat themselves at intervals that exceed calendar decades. Code lengths of 30 to 70 years (as an example and in no way an expression of limitations), depending on chipping rate, accommodate a direct relationship between time and Master PN code phase as shown in FIG. 3A.

Even at the end of multi-decade PN codes, seamlessness is maintained by modulo PN code length continuation of the PN code.

Referring still to FIGS. 2A and 2B, the PN decade-code is constructed of relatively prime subcomponent code lengths; the length of each subcomponent code X, Y, Z1, Z2 (items 21–24) do not share a multiplicand of another subcomponent code.

The following numeric examples further illustrate the prime number features of the present invention.

First, consider a master PN decade-code constructed with four subcomponent codes X, Y, $Z_1$, and $Z_2$, (items 21–24 in FIG. 2A and items 2B1–2B4 in FIG. 2B) with lengths $2^{12}$ (4096 chips), $2^{13}-1$ (8,191 chips, a prime number), $2^{17}-1$ (131,071 chips, a prime number), and $2^{14}-1$ (16,383 chips, primes of 3, 43, and 127), respectively. Combined, the subcomponent codes form a master PN decade-code that repeats itself every approximately 72 quadrillion chips (72, 043,850,780,110,848). At an example-chipping rate of 100 Mc/s, this PN code repeats itself every 22.8 years, or 2.28 decades. It will be appreciated that 100 Mc/s is used here as a convenient round number from which PN code repetition rates at other chipping rates can be calculated quickly and easily. In alternate embodiments any suitable chipping rate may be used.

In the next example, a PN decade-code is constructed of component codes X, Y, $Z_1$, and $Z_2$ with lengths $2^{12}$ (4096 chips), $2^{15}-1$ (32,767 chips, primes of 7, 31, and 151), $2^{17}-1$ (131,071 chips, a prime number), and $2^{13}-1$ (8,191 chips, a prime number), respectively. Still referring to FIGS. 2A and 2B, the component codes form a PN decade-code that repeats itself every 144 quadrillion chips (144,092,099,036, 311,552). At the example chip rate of 100 Mc/s, this PN decade-code repeats itself every 4.57 decades or 45.7 years.

The last example illustrates a PN decade code constructed of component codes X, Y, $Z_1$, and $Z_2$ with lengths $2^{12}$ (4096 chips), $2^{16}-1$ (65,535 chips, primes of 3, 5, 17, and 257), $2^{17}-1$ (131,071 chips, a prime number), and $2^{13}-1$ (8,191 chips, also a prime number), respectively. Together they form a PN decade-code that repeats itself every 288 quadrillion chips (288,188,595,548,712,960). At the example chip rate of 100 Mc/s, this PN decade-code repeats itself every 9.13 decades or 91.3 years.

Acquisition of a direct sequence spread spectrum (DSSS) signal that is constructed of four subcomponent PN codes (X, Y, $Z_1$, and $Z_2$) that are MOD combined (X⊕Y⊕$Z_1$⊕$Z_2$, meaning X xor Y xor $Z_1$ xor $Z_2$, where xor refers to exclusive-or logic) requires substantial coordination of shared, exact time, because the PN decade-code is orthogonal with other PN codes and does not correlate with any combination of subcomponent codes, taken 1 or more at a time; and, moreover, correlation only takes place within one chip of code alignment.

In a preferred embodiment of the present invention, Global Positioning System (GPS) time is used by each communication systems to achieve shared, near-perfect phase position within a PN decade-code. Phase position refers to the chip position in a PN code beginning with an X, Y, $Z_1$, $Z_2$ (major) epoch, and an epoch is defined as the all 1s condition of the state machine of the linear feedback generator that generates the PN code. GPS time is a time of week that repeats itself at GPS midnight, every Saturday. GPS Time is measured in weeks and seconds from 24:00:00, Jan. 5, 1980.

Figure 4:
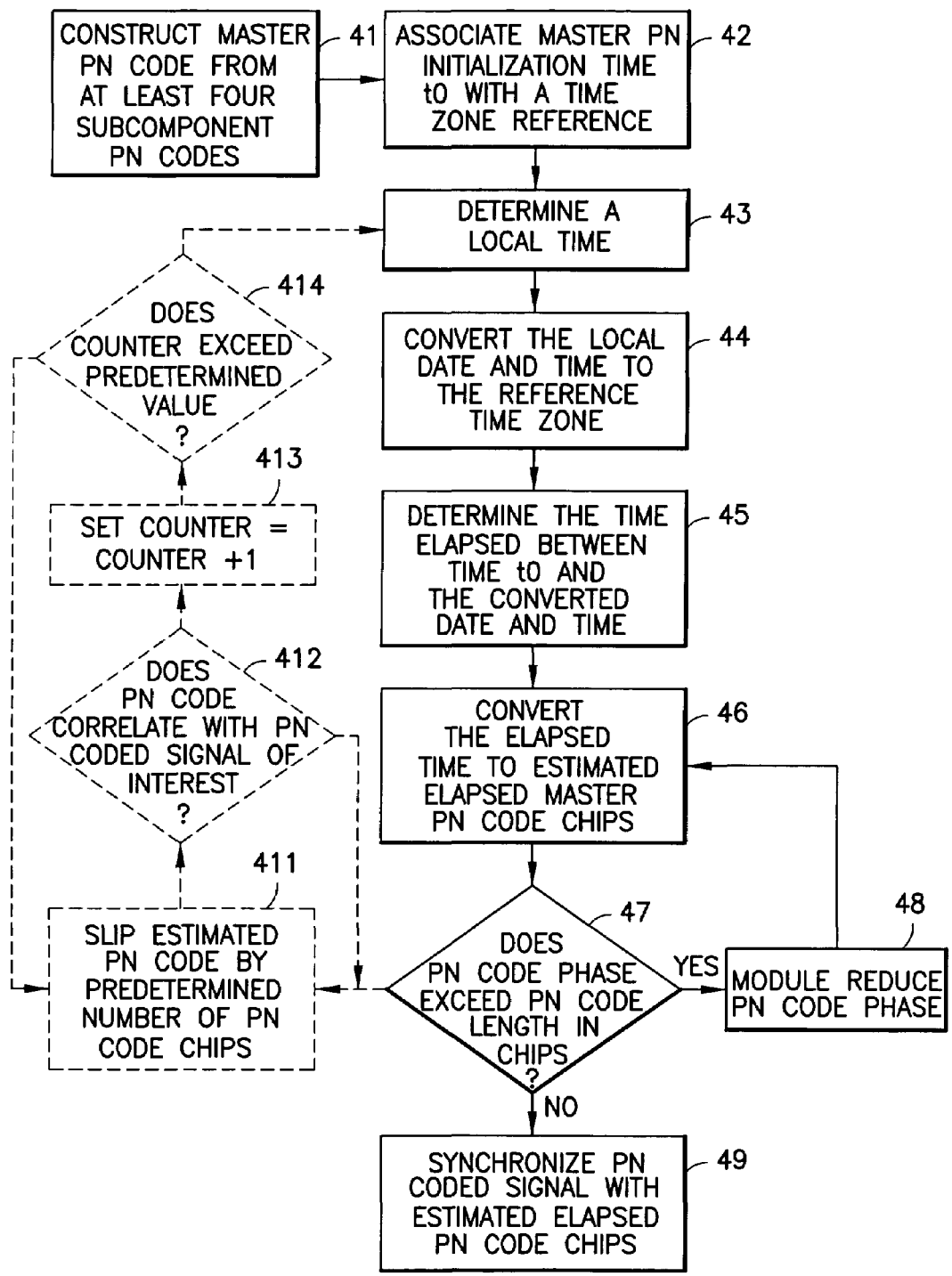
FIG. 4 is a method flow chart showing steps for one method implementing features of the present invention shown in FIG. 1.

Referring also to FIG. 4, there is shown a method of one implementation of the present invention. The first step (41) constructs the master PN decade-code as described above. It will be appreciated that in alternate embodiments, the master PN decade-code may be constructed from any suitable number of sub component codes. The next step (42) associates an initialization time $t_0$ with a reference starting point for the master PN decade-code. Step 43 determines a current local time of a platform, for example 1A1 in FIG. 1 or platform 1A5 in FIG. 2, and step 44 converts the local time to the time and date associated with the time zone in which master PN decade time $t_0$ is associated. The next step (45) determines the elapsed time between time $t_0$ and the converted current local time. Step 46 converts the elapsed time to an estimated elapsed master PN decade-code chips, i.e., estimated master PN decade-code phase. Step 47 checks to see if the elapsed time exceeds the length of the PN decade-code in chips and modulo reduces the determined PN code phase, step 48, if the result is affirmative. Otherwise, the determined calculated PN code phase is within a suitable range of computational algorithms (item 1C2 in FIG. 1C) to slip or advance the estimated PN decade-code to synchronize, step 49, with the phase of the PN decade-coded signal and capture the PN coded signal of interest.

By way of example, but not limiting, the PN decade-code phase is the phase that a PN decade-code generator would have, if free running at the nominal chipping rate, had the generator begun from its major epoch. For illustration purposes, the generator major epoch in the following numerical descriptions is on midnight, Saturday, Jan. 1, 2000, London, England; which means that the PN decade-code begins at the first instant of Sunday morning ($t_0$), Jan. 2, 2000. The arbitrary selection of the first Sunday in the year 2000 accommodates a common starting boundary used by GPS time, which simplifies the examples presented herein, but is not meant to be limiting. In alternate embodiments, any suitable starting time and date could be selected. Also, in alternate embodiments, the master PN decade-code generator could be pre-seeded so as to appear to start from an already past date. For the purposes of the description herein, time measured from $t_0$ to a current GPS Time of Week and expressed in equivalent PN decade-code chips, is referred to as Seamless Composite PN Code Phase or Seamless Phase.

Using GPS Time-of-Week (TOW), as the Reference Starting Point, and the present calendar date of a common reference point, for example, London, England, or the Prime Meridian, a communication system determines its PN decade-code phase. First, the time duration between the PN decade-code $t_0$ and London's most recent Sunday morning (the beginning of the GPS week) must be determined. In one embodiment, a standard Gregorian Date to Julian Day converter can be used to accomplish this. For example, the Julian Day for Jan. 2, 2000, $t_0$, is 2,451,545. Given an example present calendar date of interest as Jun. 25, 2001, its Julian Day is 2,452,085, a difference from $t_0$ of 540 days (2,452,085−2,451,545). The number 540, modulo 7 gives 1, meaning that Jun. 25, 2001 falls on a Monday. In this example, if a Delta Day result modulo 7 equals 0, it would indicate that the date under consideration falls on a Sunday because the reference day ($t_0$) falls on a Sunday. Delta Day results modulo 7 cross-reference to days of the week as follow: 0 (Sunday), 1 (Monday), 2 (Tuesday), 3 (Wednesday), 4 (Thursday), 5 (Friday), and 6 (Saturday). It follows that the time duration between $t_0$ and London's most recent Sunday is the Delta Day result minus Delta Days modulo 7 and is represented by:

Delta Days MOD Sunday=(Julian Day of Interest−2,451,545)−(Julian Day of Interest−2,451,545) MOD7     Equation 1

For example, assume that a fleet assembles on Wednesday (or a ship joins the fleet), Jan. 12, 2000 and $t_0$ is still Jan. 2, 2000. The present Julian Day is 2,451,555. Delta Days is 10 days. Delta Days modulo 7 is 3, and Delta Days modulo Sunday is 10−3=7, which means that the fleet should have as its PN decade-code phase 7 days (1 week) of PN decade-code phase measured from $t_0$, plus the PN decade-code phase equal to the instantaneous GPS time, which began first thing Sunday morning.

Determining the PN decade-code phase in chips from Jan. 2, 2000 ($t_0$) to the Sunday morning immediately prior to the London Date of Interest is determined in order to determine the number of free-running chips that has occurred in this integer number of days. For example, the PN decade-code phase in chips from Jan. 2, 2000 to the Sunday morning immediately prior to the London Date of Interest, Jun. 25, 2001, (Julian Day 2,452,085), can be determined by multiplying Delta Days MOD Sunday by the chipping rate as follows:

$$PN \text{ Code Phase MOD Sunday} = \\ R_{C\_Machine\ Exact} \times \text{Delta Days MOD} \\ \text{Sunday(Julian Day of Interest)} \times \frac{86,400 \text{ seconds}}{\text{day}}$$
Equation 2

Equation 2 illustrates that the composite PN code phase from $t_0$ to the most recent Sunday morning is the machine-exact chipping rate times the Delta Days MOD Sunday times the number of seconds per day. The Delta Day MOD Sunday for Jun. 25, 2001 is Delta Day MOD Sunday (2,452,085), which, in this example, equals 539 days. Delta Days from Jan. 2, 2000 to Jun. 25, 2001 is 540 days. Jun. 25, 2001 is a Monday, so one day must be subtracted from 540 days, which is accomplished by means of 540 MOD 7=1. For a chipping rate of 325 Mc/s, Equation 2 yields 325 Mc/s×539 days×86,400 sec/day=15,135,120,000,000,000 chips.

The numerical value of the chipping rate ($R_c$) used in Equation is not the ideal chipping rate; it is the chipping rate realized by the Direct Digital Synthesizer that generates the chipping rate. It is nearly identical to the ideal chipping rate, and it is within ½ LSB of the direct digital synthesizer's granularity. For example, assume that the granularity of a synthesizer is $3 \times 5^7/2^{20}$, which approximately equals 0.2235 Hz. Using 325 Mc/s as an example, the synthesizer's seed word that generates a 325 Mc/s chipping rate is 325 Mc/s×$2^{20}/3/5^7$=1,454,025,387. Converting back into a chipping rate in Hertz, the direct digital synthesizer is able to realize a chipping rate equal to the seed word times the reverse digital process: $1,454,025,387 \times 3 \times 5^7/2^{20}$=325,000,000.074505805 c/s, approximately. The fractional chips (0.074505805) times 604,800 seconds per week accumulates 45,061 chips per week. The PN code phase of a platform attempting to join a fleet immediately following a Sunday morning must have the same PN code phase as would be had by the fleet that experienced the machine-exact chipping rate throughout the week and into the week in which the newly arriving platform arrives; the fleet experiences the machine-exact chipping rate per time, and newly arriving platforms, and all platforms for that matter, must use the machine-exact chipping rate in all PN code phase calculations.

For this example, it can be seen that the machine-exact PN code phase is roughly three and a half million chips greater than the PN decade-code phase calculated with the ideal chipping rate; or in other words:

1,454,025,387×3×5^7×539×86,400/2^20=15,135,120,003,469,705.4 chips

The following equation insures that a Delta Day conversion into chips results in a number of chips that is less than the length of the PN decade-code. This number is guaranteed to be less than or smaller than the total PN code length, and allows Delta Day time periods to exceed the length of a given code.

PN Code Phase MOD Sunday=(PN Code Phase MOD Sunday)MOD $L_X L_Y L_{Z1} L_{Z2}$     Equation 3

GPS Time of Week, in units of microseconds, is converted into chips by multiplying the machine-exact chipping rate by time. For example, assume that a platform initializes its communication system late on a Saturday evening, Jun. 30, 2001. The platform captures GPS time at one of the platform's XY epochs: 604,700,607,880 microseconds. Continuing with the machine-exact example, GPS time converted into chips is as follows:

$$\text{GPS\_ToW} \rightarrow \text{Chips} = 1,454,025,387 \times \frac{3 \times 5^7}{2^{20}} \times \qquad \text{Equation 4}$$

$$604,700,607,880 \text{ } \mu\text{sec} \times \frac{1 \text{sec}}{1,000,000 \text{ } \mu\text{sec}} =$$

$$196,527,697,606,052 \text{ chips}$$

In a preferred binary arithmetic embodiment, multiplications are performed prior to divisions, and the intermediate product of Equation 4 is 2.06E26, which is an 88-bit number.

The PN decade-code phase is the sum of Delta Days MOD Sunday converted into chips plus GPS Time-of-Week converted into chips, which, following the example, is 15,135,120,003,469,705 chips plus 196,527,697,606,052 chips, respectively, which sum is 15,331,647,701,075,757 chips. Had its PN generator been running since midnight, Jan. 1, 2001, this is the composite PN code phase that the platform should have had at the time it captured GPS time. A platform's PN decade-code phase may be described as follows:

$$\theta_{PN} = TSI_{\rightarrow Chips} + \Delta\theta_{PN} = TSI_{\rightarrow Chips} + \Delta\theta_{XYZ_1Z_2} + \Delta\Sigma\theta \qquad \text{Equation 5}$$

Equation 5 illustrates that the PN decade-code phase ($\theta_{PN}$), the actual chip position within the entire PN decade-code, from $XYZ_1Z_2$ epoch to $XYZ_1Z_2$ epoch, is equal to the number of free-running chips ($TSI_{\rightarrow Chips}$, which is Time Since Initialization, measured by the platform, according to the reference clock that generates the PN decade-code, converted into chips) plus delta phase ($\Delta\theta_{PN}$). Equation 5 explains, further, that delta phase consists of intentional slips or advances ($\Delta\theta_{XYZ1Z2}$) plus accumulated phase ($\Delta\Sigma\theta$, delta accumulated phase), which may be due to deviations from the free-running chipping rate because of Doppler shift, clock disagreement, or intentional clock correction.

Accumulated Phase ($\Delta\Sigma\theta$) may be determined by a platform as follows:

$$\#CLK_{\rightarrow Chips} = TSI_{\rightarrow Chips \text{ via exact conversion}} + \Delta\Sigma\theta \qquad \text{Equation 6}$$

In order for a platform to calculate its accumulated phase, as in Equation 6, it must count the chip-exact number of chip-generating clock cycles, and it must measure the time since initialization of the PN generators, the time at which the PN generators began at their major epoch. Delta Accumulated Phase is calculated by subtracting the number of chips that should have taken place in a measured time duration (TSI converted into a time-to-chip exact number of chips) from the number of chips actually counted in the measured time period.

A platform can capture its TSI within certain granularity. For the sake of an example, assume that a platform can capture its TSI within a 25.6 μs LSB (least significant bit). Using Equation 5, assume that no intentional slips or advances of the PN code have taken place and negligible phase has accumulated within the first 30 seconds since initialization. The platform captures its TSI at an XY epoch at the time it captured GPS Time of Week: TSI=1,177,595 25.6 μs LSBs. The platform calculates its composite PN code phase as follows:

$$\theta_{PN} = \qquad \text{Equation 7}$$
$$TSI \times \frac{2}{5^7} \times 1,454,025,387 \times \frac{3 \times 5^7}{2^{20}} = 9,797,590,402 \text{ chips}$$

$$\theta_{PN} = \theta_{PN} + 10,000 \qquad \text{Equation 8}$$

$$\theta_{PN} = [\theta_{PN} - (\theta_{PN \text{ MOD}} L_X L_Y)] \text{MOD } L_{XYZ_1Z_2} \qquad \text{Equation 9}$$

When a platform captures its TSI with, for example, a 25.6 μs granularity, the time it captures can be exactly correct (the TSI counter was captured immediately after it incremented to the captured value), or the time it captures can be as latent as 25.6 μs (the TSI counter was captured immediately prior to incrementing). At 325 Mc/s, the 25.6 μs latency can account for 8,320 chips too few being counted (25.6 μs×325 Mc/s). Therefore, as shown in Equation 8, a number arbitrarily larger than 8,320 and much smaller than an XY number of chips is added to the results of Equation 7 (9,797,590,402+10,000=9,797,600,402, following the example). In alternate embodiments, any suitable number could be added to the result. This guarantees that the calculated PN decade-code phase is slightly more than an integer number of XY epochs. Equation 9 is used to calculate the chip-exact composite PN code phase of the platform at the time it captured its TSI and GPS Time of Week. Equation 9 subtracts the modulo remainder of an integer number of XY epochs from Seamless Phase (for $L_X L_Y = 2^{12} \times 2^{15} - 1 = 134,213,632$, it follows that 9,797,600,402 MOD 134,213,632=5,266 and 9,797,600,402−5,266=9,797,595, 136, which is the XY epoch, chip-exact composite PN code phase of the platform). Further, by performing a modulo code length function on a platform's composite PN code phase, the magnitude of composite code phase is kept smaller than the code length ($L_{XYZ1Z2}$), which accommodates multi-decade time durations (that are longer than the PN code length being used). This also accommodates PN codes whose lengths are shorter than a GPS week.

Next (step 49 in FIG. 4) performs a platform PN code slip to achieve alignment with the PN decade-code with seamless phase.

Equation 9 indicates the platform's PN decade-code phase at the time it captured GPS Time of Week and its own PN code phase information. The sum of Equation 3 and Equation 4 is Seamless Phase at the time of capture. If a platform were to slip the difference between Seamless Phase and its own PN code phase, the platform's composite code phase would be brought into agreement with Seamless Phase. It will be appreciated that the term slip is used interchangeably with the term advance because a PN code advance is accomplished by slipping all of the way around a code until the phase to be advanced is achieved; slipping the length of the code minus the amount to be advanced performs advances in PN codes. The platform uses Equation 10 to advance or slip its PN code phase in order to bring its own composite PN code phase into agreement with Seamless Phase.

$$\Delta\_\text{Seamless Phase} = PN \text{ Code Phase MOD Sunday} + GPS\_ToW_{\rightarrow Chips} - \theta_{PN} \qquad \text{Equation 10}$$

Thus, the Delta Seamless Phase equals 15,135,120,003, 469,705 (Delta Phase MOD Sunday)+196,527,697,606,052

(GPS Time of Week→Chips)+9,797,595,136 (the platform's composite PN code Phase)=15,331,637,903,480,621. If the platform in this example were to advance its composite PN code by this Delta Seamless Phase, the platform's composite PN code phase would agree with Seamless Phase. Once the platform's PN code phase is brought into agreement with the master PN decade-code or Seamless Phase, spatial uncertainties are searched, chip by chip or groups-of-chips by groups-of-chips, until chip-exact alignment with other platforms is achieved, accomplishing communication among platforms. In alternate embodiments, a counter or timer may be used to limit (steps 411–414 in FIG. 4) the search for chip-exact alignment before repeating the process.

It is appreciated that the PN-decade codes described herein provide unambiguous PN code phase throughout calendar decades and allows DSSS communication systems to join or rejoin a particular communication network operating with a PN-decade code. In the preferred embodiment, the DSSS communication systems operating with PN-decade codes are collocated with naval platforms (ships, aircraft, etc) and advantageously allow the platforms to join and communicate with a fleet at any time with unambiguous time and unambiguous PN code phase alignment.

The use of four component codes allows for high chipping rates and pseudo-noise (PN) code lengths that repeat themselves at intervals that exceed calendar decades. The method obviates repeatable schedules of PN code phase versus time within an hour or time of day or time of week, et cetera.

It is also appreciated that platform communication systems operating with the PN-decade codes described herein can arrive at an already assembled fleet of platforms and resolve spatial uncertainties without time ambiguities or calendar ambiguities. Advantageously, a fleet, or components of the fleet, may assemble at any desired time without time or calendar ambiguities and without having to reset all fleet participants to a common clock reference; and no ambiguous register rollovers exist (as with GPS week counters that roll over).

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for synchronizing a phase of at least one pseudo-noise (PN) code with a phase of a master PN code, the master PN code having an initialization time $t_0$, the method comprising the steps of:
   associating time $t_0$ with a first time zone reference date and time;
   determining an elapsed time $t_1$;
   substantially equating the elapsed time $t_1$ to a corresponding phase of the master PN code, wherein the master PN code comprises a periodicity substantially greater than the elapsed time $t_1$; and
   synchronizing the phase of the at least one PN code with the corresponding phase of the master PN code.

2. A method as in claim 1 wherein the step of determining the elapsed time $t_1$ further comprises the steps of:
   determining a first local-time;
   converting the first local-time to a first time zone current date and time; and
   determining the time elapsed between the first time zone reference date and time and the first time zone current date and time.

3. A method as in claim 2 wherein the step of determining the first local-time further comprises the step of determining a first local Global Positioning System (GPS) time.

4. A method as in claim 3 wherein the step of determining the first local GPS time further comprises the step of receiving the first local GPS time from a plurality of satellites.

5. A method for synchronizing a phase of at least one pseudo-noise (PN) code with a phase of a master PN code, the master PN code having an initialization time $t_0$, the method comprising the steps of:
   determining an elapsed time $t_1$;
   substantially equating the elapsed time $t_1$ to a corresponding phase of the master PN code, wherein the master PN code comprises a periodicity substantially greater than the elapsed time $t_1$; and
   synchronizing the phase of the at least one PN code with the corresponding phase of the master PN code.

6. A method as in claim 5 wherein the step of determining the elapsed time $t_1$ further comprises the steps of:
   providing a master clock;
   initializing the master PN code and the master clock substantially simultaneously at the time $t_0$; and
   determining from the master clock the time $t_1$.

7. A method as in claim 6 wherein the step of providing the master clock further comprises the step of providing a Global Positioning Satellite (GPS) clock signal.

8. A method as in claim 6 wherein the step of determining from the master clock the time $t_1$ further comprises the steps of:
   providing at least one slave clock, wherein the initialization of the at least one slave clock is synchronized with the initialization of the master clock;
   determining from the at least one slave clock the elapsed time $t_1$.

9. A system for acquiring a pseudo-noise (PN) coded signal, the PN code of the signal having initialization time $t_0$, the system comprising:
   a link control processor for capturing GPS time and converting the captured GPS time to elapsed PN code chips since time $t_0$; and
   a correlator for aligning the PN code phase in accordance with the elapsed PN code chips.

10. A system as in claim 9 wherein the system for acquiring a pseudo-noise (PN) coded signal further comprises:
    a PN code generator, wherein the PN code generator comprises at least four PN component code generators $G_1 \ldots G_4$ generating PN component codes $PN_1 \ldots PN_4$, respectively.

11. A system as in claim 10 wherein each of the PN codes $PN_1 \ldots PN_4$ comprise chip lengths substantially equal to a unique relatively prime number.

12. A method for GPS-aided, seamless acquisition of a pseudo noise (PN) coded signal, wherein the PN coded signal is modulated by a PN master code starting at a PN code initialization time $t_0$ in zone $z_0$, the method comprising the steps of:
    determining a GPS time;
    converting the GPS time to a first estimate of elapsed number of chips associated with the PN master code; and
    adjusting the first estimate of the elapsed number of chips associated with the PN master code to correlate with the PN coded signal.

13. A method as in claim 12 wherein the step of determining the GPS time further comprises the steps of:
   determining a local GPS time; and
      converting the local GPS time to a second GPS time, wherein the second GPS time corresponds to the zone $z_0$.

14. A method as in claim 12 wherein the step of converting the GPS time to the first estimate of elapsed number of chips associated with the PN master code further comprises the step of adding a predetermined number of chips to the first estimate.

15. A method as in claim 14 wherein the method for GPS-aided, seamless acquisition of a pseudo noise (PN) coded signal further comprises the step of synchronizing the first estimate of elapsed number of chips with the first PN coded signal.

16. A method as in claim 14 wherein the method for GPS-aided, seamless acquisition of a pseudo noise (PN) coded signal further comprises the step of slipping the first estimate of elapsed number of chips a predetermined amount of PN chips.

17. A method as in claim 16 wherein the step of slipping the first estimate of elapsed number of chips the predetermined amount further comprises the step of slipping the first estimate a predetermined maximum number of times.

18. A method as in claim 12 further comprising the step of:
   providing the PN master code, wherein the step of providing the PN master code further comprises the step of:
      combining at least four PN component codes $PN_1 \ldots PN_4$, wherein the at least four PN component codes $PN_1 \ldots PN_4$ comprise chip lengths substantially equal to a unique relatively prime number.

19. A method as in claim 18 wherein the step of providing the PN master code further comprises the step of:
   determining the PN master code such that the PN master code operates continuously for a predetermined time span before repeating.

20. A method as in claim 19 wherein the predetermined time span comprises at least ten years.

* * * * *